US011037125B2

(12) United States Patent
Nambu et al.

(10) Patent No.: US 11,037,125 B2
(45) Date of Patent: Jun. 15, 2021

(54) ELECTRONIC DATA TRANSMISSION IN AN ELECTRONIC RECEIPT SYSTEM WITH REDUCED DATA TRAFFIC

(71) Applicant: TOSHIBA TEC KABUSHIKI KAISHA, Tokyo (JP)

(72) Inventors: Kazuya Nambu, Tokyo (JP); Yasuhiro Arai, Shizuoka (JP); Kenji Sakurai, Shizuoka (JP); Makoto Yoshimura, Tokyo (JP); Yuriko Nishioka, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 168 days.

(21) Appl. No.: 16/357,953

(22) Filed: Mar. 19, 2019

(65) Prior Publication Data
US 2019/0325418 A1 Oct. 24, 2019

(30) Foreign Application Priority Data
Apr. 24, 2018 (JP) ............................. JP2018-083456

(51) Int. Cl.
*G06Q 20/20* (2012.01)
*G06Q 30/02* (2012.01)
*G06Q 20/04* (2012.01)

(52) U.S. Cl.
CPC ......... *G06Q 20/209* (2013.01); *G06Q 20/047* (2020.05); *G06Q 30/0207* (2013.01)

(58) Field of Classification Search
None
See application file for complete search history.

(56) References Cited

U.S. PATENT DOCUMENTS 9,105,058 B2 * 8/2015 Suzuki .................... G07G 5/00
2014/0236713 A1 8/2014 Gotanda et al.
(Continued)

FOREIGN PATENT DOCUMENTS

JP 2006-244066 A 9/2006
JP 2007-172023 A 7/2007
(Continued)

OTHER PUBLICATIONS

Extended European Search Report dated Oct. 24, 2019, filed in counterpart European Patent Application No. 19170754.6, 10 pages.
(Continued)

*Primary Examiner* — Paul Danneman
(74) *Attorney, Agent, or Firm* — Kim & Stewart LLP

(57) ABSTRACT

A point-of-sale terminal includes a storage device in which first form data specifying a first image layout of image elements on a paper slip to be printed by the printer is stored, and a processor. The processor is configured to determine whether or not a promotion is offered, and determine whether or not an electronic receipt is issued. The processor is further configured to control a printer to print an image indicating the promotion on a paper slip with the first image layout, when it is determined that the promotion is offered and the electronic receipt is not issued, and control a communication interface to transmit promotion data of the promotion in a text format, when it is determined that the promotion is offered and the electronic receipt is issued. The promotion data includes a form identifier of the first image layout and does not include the first form data.

20 Claims, 8 Drawing Sheets

(56) References Cited

U.S. PATENT DOCUMENTS

| | | | |
|---|---|---|---|
| 2014/0249951 A1 | 9/2014 | Gotanda et al. | |
| 2014/0307271 A1 | 10/2014 | Suzuki | |
| 2015/0206111 A1 | 7/2015 | Sugiyama | |
| 2015/0262157 A1* | 9/2015 | Chihara | G06Q 20/209 705/21 |
| 2016/0086454 A1 | 3/2016 | Kelly, III et al. | |
| 2018/0075430 A1 | 3/2018 | Suzuki | |

FOREIGN PATENT DOCUMENTS

| | | |
|---|---|---|
| JP | 2012-113392 A | 6/2012 |
| JP | 2014-527252 A | 10/2014 |
| WO | 2013/040591 A2 | 3/2013 |

OTHER PUBLICATIONS

Japanese Notice of Reasons for Refusal dated Oct. 6, 2020 in corresponding Japanese Patent Application No. 2018-083456, 6 pages (with Translation).

\* cited by examiner

| |  |
|---|---|
| COUPON CODE | F1 |
| BARCODE | F2 |
| MESSAGE (1) | F3 |
| MESSAGE (2) | F4 |
| MESSAGE (3) | F5 |
| MESSAGE (4) | F6 |
| MESSAGE (5) | F7 |
| MESSAGE (6) | F8 |
| MESSAGE (7) | F9 |
| EXPIRY DATE MANAGEMENT TITLE | F10 |
| EXPIRY DATE | F11 |
| MEMBER CODE TITLE | F12 |
| IMAGE FILE NAME | F13 |
| PATTERN NUMBER | F14 |
| APPLICABLE CONDITION | F15 |

FIG.6

```
APRIL 1ST (SUNDAY) 2018 13: 44
REGISTER 1234

PERSON IN CHARGE NO 99999999 YAMADA TARO
SRID
2300000224081*H

[COUPON CODE]
000001
 [START DATE]
APRIL 1ST (SUNDAY) 2018
 [BARCODE PRINTING]
1234567890123456
 [MESSAGE 1]
*APPRECIATION COUPON FOR CUSTOMER*
 [MESSAGE 2]
     YOGURT  DISCOUNT OF 50 YEN!
 [MESSAGE 3]
IN EXCHANGE FOR THIS COUPON WITHIN BUSINESS HOURS IN TOKYO BRANCH
 [MESSAGE 4]
EFFECTIVE "ONLY ONCE"
 [MESSAGE 5]
※EFFECTIVE ONLY IN TOKYO BRANCH ※DISABLED TO TOTALIZE WITH OTHER BRANCH
 [MESSAGE 6]
※EXCEPT FOR SPECIALIZED STORE ※POINT TARGET
 [MESSAGE 7]

[EXPIRY DATE MANAGEMENT TITLE]
EXPIRY DATE
 [EXPIRY DATE]
APRIL 7TH 2018
 [MEMBER CODE TITLE]
MEMBER CODE
 [MEMBER CODE]
230000024081
 [MEMBER NAME]
SATO HANAKO
 [IMAGE FILE NAME]
0102BITMAP.bmp
 [PATTERN NUMBER]
1

RECEIPT NUMBER 5678
TORE NUMBER 54321
``` ated. The first processor is configured to control the printer to print an image indicating the promotion on a paper slip with the first image layout specified by the first form data, when it is determined that the promotion is offered and the electronic receipt is not issued with respect to the transaction. The first processor is configured to control the first communication interface to transmit promotion data of the promotion in a text format, the promotion data including a form identifier of the first image layout and not including the first form data, when it is determined that the promotion is offered and the electronic receipt is issued with respect to the transaction. The electronic receipt server includes a second communication interface configured to communicate with the first communication interface, a second storage device in which second form data specifying a second image layout corresponding to the first image layout is stored, and a second processor. The second processor is configured to generate promotion screen data for displaying the promotion with the second image layout specified by the second form data, based on the form identifier included in the promotion data, when the second communication interface receives the promotion data, and control the second communication interface to transmit the promotion screen data to a customer terminal.

ELECTRONIC DATA TRANSMISSION IN AN ELECTRONIC RECEIPT SYSTEM WITH REDUCED DATA TRAFFIC

CROSS-REFERENCE TO RELATED APPLICATION

This application is based upon and claims the benefit of priority from Japanese Patent Application No. 2018-083456, filed on Apr. 24, 2018, the entire contents of which are incorporated herein by reference.

FIELD

Embodiments described herein relate generally to an electronic receipt system, in particular, electronic data transmission in the electronic receipt system.

BACKGROUND

When a predetermined issuance condition is satisfied for a transaction, a point-of-sale (POS) terminal or the like issues an individual promotion different from a receipt indicating contents of the transaction. Recently, because the number of companies that issue the individual promotion receipt is increased or a plurality of individual promotion receipts is issued for one transaction, the number of individual promotion receipts received by a receiving party has become difficult to manage.

It is desirable to reduce the burden on service providers and customers handling the increased number of promotions.

DESCRIPTION OF THE DRAWINGS

FIG. 6 is a conceptual diagram illustrating an example of dummy data corresponding to the paper coupon shown in FIG. 5.

DETAILED DESCRIPTION

According to an embodiment, a system includes a point-of-sale (POS) terminal and an electronic receipt server. The POS terminal includes a printer, a first communication interface, a first storage device in which first form data specifying a first image layout of image elements on a paper slip to be printed by the printer is stored, and a first processor. The first processor is configured to determine whether or not a promotion is offered with respect to a transaction, determine whether or not an electronic receipt is issued with respect to the transaction. The first processor is configured to control the printer to print an image indicating the promotion on a paper slip with the first image layout specified by the first form data, when it is determined that the promotion is offered and the electronic receipt is not issued with respect to the transaction. The first processor is configured to control the first communication interface to transmit promotion data of the promotion in a text format, the promotion data including a form identifier of the first image layout and not including the first form data, when it is determined that the promotion is offered and the electronic receipt is issued with respect to the transaction. The electronic receipt server includes a second communication interface configured to communicate with the first communication interface, a second storage device in which second form data specifying a second image layout corresponding to the first image layout is stored, and a second processor. The second processor is configured to generate promotion screen data for displaying the promotion with the second image layout specified by the second form data, based on the form identifier included in the promotion data, when the second communication interface receives the promotion data, and control the second communication interface to transmit the promotion screen data to a customer terminal.

An embodiment is described below with reference to the accompanying drawings. In the present embodiment, an electronic receipt system including a POS terminal having a function of a settlement apparatus and an electronic receipt server having a function of a promotion receipt server is described as an example.

Figure 1:
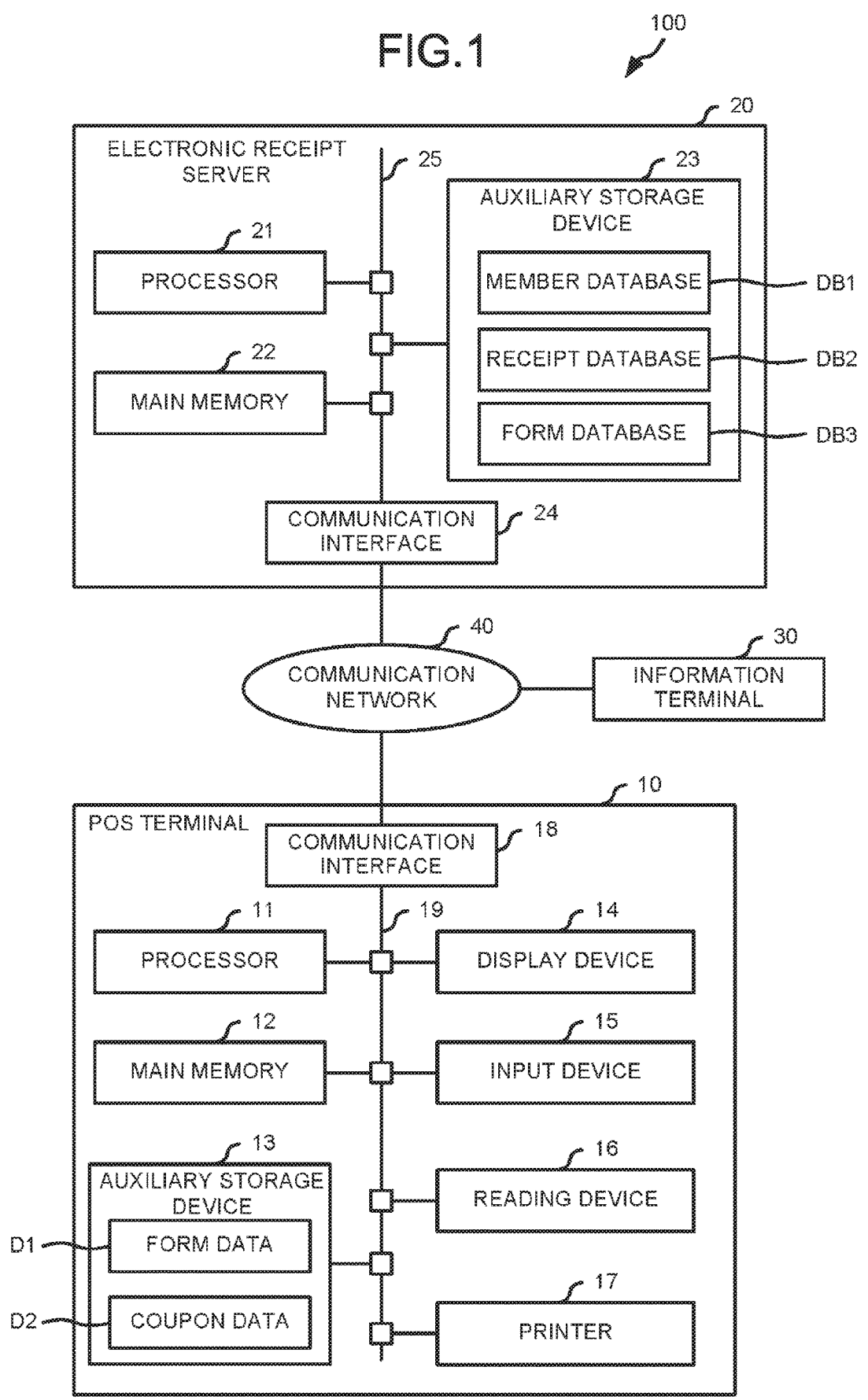
FIG. 1 is a block diagram illustrating a schematic configuration of an electronic receipt system according to an embodiment, which includes a POS terminal and an electronic receipt server.

FIG. 1 is a block diagram illustrating a schematic configuration of an electronic receipt system 100 according to the present embodiment, which includes a POS terminal 10 and an electronic receipt server 20.

The electronic receipt system 100 is configured in such a manner that the electronic receipt server 20 is capable of communicating with the POS terminal 10 and an information terminal 30 via a communication network 40. The electronic receipt system 100 typically includes a plurality of POS terminals 10 and a plurality of information terminals 30; however, in FIG. 1, only one POS terminal 10 and one information terminal 30 are shown.

The POS terminal 10 registers contents of any transaction such as sales of a commodity, provision of food and drink, provision of a service, etc., and further executes information processing for settling a price relating to the transaction. In other words, the POS terminal 10 has a function of a settlement apparatus for settling a price relating to the transaction. The POS terminal 10 transmits receipt data indicating the contents of the transaction to the electronic receipt server 20 when a customer who conducts the transaction is a member of an electronic receipt service. Below, the object transaction refers to the sales of the commodity.

The electronic receipt server 20 stores the receipt data transmitted from the POS terminal 10, and performs information processing for providing an electronic receipt service for confirmation of the receipt data using the information terminal 30.

The information terminal 30 may be any information processing apparatus that can be used by a member who utilizes the electronic receipt service and functions as a client by accessing the electronic receipt server 20 via the communication network 40. The information terminal 30 may be connected to the communication network 40 via either wired communication or wireless communication. The information terminal 30 may be an existing device such as a smartphone, a tablet terminal, a cellular phone device, a personal computer and the like. Therefore, the detailed description of the information terminal 30 is omitted.

The communication network 40 may be the Internet, a VPN (Virtual Private Network), a LAN (Local Area Network), a public communication network, a mobile communication network, etc. singly or in an appropriate combination. Typically, the communication network 40 is a combination of the Internet, the VPN and the mobile communication network.

The POS terminal 10 includes a processor 11, a main memory 12, an auxiliary storage device 13, a display device 14, an input device 15, a reading device 16, a printer 17, a communication interface 18 and a transmission path 19. The processor 11, the main memory 12, the auxiliary storage device 13, the display device 14, the input device 15, the reading device 16, the printer 17 and the communication interface 18 are connected to each other via the transmission path 19. In the POS terminal 10, the processor 11, the main memory 12 and the auxiliary storage device 13 are connected to each other via the transmission path 19 to serve as a computer for performing information processing for controlling the POS terminal 10.

The processor 11 acts as a central functional component of the computer. The processor 11 executes an information processing program such as an operating system, a middleware and application programs to execute information processing to control each functional component of the computer to perform various functions of the POS terminal 10.

The main memory 12 acts as main storage of the above-described computer. The main memory 12 includes a nonvolatile memory area and a volatile memory area. The main memory 12 stores the above-described information processing programs in the nonvolatile memory area. The main memory 12 may store data required for the processor 11 to execute processing to control each section in the nonvolatile memory area or the volatile memory area in some cases. The main memory 12 uses the volatile memory area as a work area in which the data is appropriately rewritten by the processor 11.

The auxiliary storage device 13 acts as auxiliary storage of the above-described computer. The auxiliary storage device 13 is, for example, an EEPROM (electric erasable programmable read-only memory), an HDD (hard disc drive), an SSD (solid state drive) or other known storage devices. The auxiliary storage device 13 stores data used by the processor 11 to perform various kinds of processing and data generated in processing executed by the processor 11. The auxiliary storage device 13 may also store the information processing program in some cases.

The display device 14 displays various screens for providing an operator with various kinds of information. The display device 14 may be, for example, a known device such as a liquid crystal display device or the like.

The input device 15 inputs various instructions from the operator. As the input device 15, known devices such as a touch sensor or a keyboard may be used alone or in combination.

The reading device 16 reads data stored in a storage medium. As the reading device 16, known devices such as a barcode scanner or a card reader may be used alone or in combination.

The printer 17 issues a receipt (hereinafter, referred to as a paper receipt) and a coupon (hereinafter, referred to as a paper coupon) by printing a receipt image and a coupon image on the receipt paper. The paper coupon is handed over to a user for individual promotion, and is a type of promotion receipt for individual promotion.

The communication interface 18 performs data communication via the communication network 40. The communication interface 18 may be, for example, a known device capable of performing known processing for data communication via the Internet.

The transmission path 19 includes an address bus, a data bus, a control signal line, and the like, and transmits data and control signals transmitted and received between the connected sections.

The POS terminal 10 stores the information processing program for performing information processing described below in the main memory 12 or the auxiliary storage device 13. The information processing program may be stored in the main memory 12 or the auxiliary storage device 13 when hardware of the POS terminal 10 is transferred, or may be transferred separately from the above-described hardware. In the latter case, the information processing program is transferred via a network or by being recorded in a removable recording medium such as a magnetic disk, a magneto-optical disk, an optical disk, a semiconductor memory, etc.

The electronic receipt server 20 includes a processor 21, a main memory 22, an auxiliary storage device 23, a communication interface 24 and a transmission path 25. The processor 21, the main memory 22, the auxiliary storage device 23 and the communication interface 24 are connected to each other via the transmission path 25. The processor 21, the main memory 22 and the auxiliary storage device 23 are connected to each other by the transmission path 25 to serve as a computer that performs information processing for controlling the electronic receipt server 20.

The processor 21 acts as a central functional component of the computer. The processor 21 executes an information processing program such as an operating system, a middleware and application programs to control each functional component of the computer to perform various functions of the electronic receipt server 20.

The main memory 22 acts as main memory of the computer. The main memory 22 includes a nonvolatile memory area and a volatile memory area. The main memory 22 stores the above-described information processing program in the nonvolatile memory area. The main memory 22 may store data required to execute processing for the processor 21 to control each section in the nonvolatile memory area or the volatile memory area in some cases. The main memory 22 uses the volatile memory area as a work area in which the data is appropriately rewritten by the processor 21.

The auxiliary storage device 23 acts as auxiliary storage of the computer. The auxiliary storage device 23 is, for example, an EEPROM, an HDD, an SSD or other known storage devices. The auxiliary storage device 23 stores data used by the processor 21 to perform various kinds of processing and data generated in processing executed by the processor 21. The auxiliary storage device 23 may also store the above-described information processing program in some cases.

The communication interface 24 performs data communication via the communication network 40. As the communication interface 24, for example, a known device capable of performing known processing for data communication via the Internet may be used.

The transmission path 25 includes an address bus, a data bus, a control signal line, and the like, and transmits data and control signals transmitted and received between the connected sections.

The electronic receipt server 20 can perform the below-described information processing by writing the information processing program for performing the information processing in the main memory 22 or the auxiliary storage device 23 using a general purpose computer used by a server as hardware. The information processing program may be stored in the main memory 22 or the auxiliary storage device 23 when the electronic receipt server 20 is transferred, or may be transferred separately from the above-described general purpose computer. In the latter case, the information processing program is transferred via a network or by being recorded in a removable recording medium such as a magnetic disk, a magneto-optical disk, an optical disk, a semiconductor memory, etc.

The data stored in the auxiliary storage device 13 includes form data D1 and coupon data D2. The form data D1 indicates a form of the coupon. The coupon data D2 indicates a plurality of display objects constituting one coupon.

Figures 2, 3:
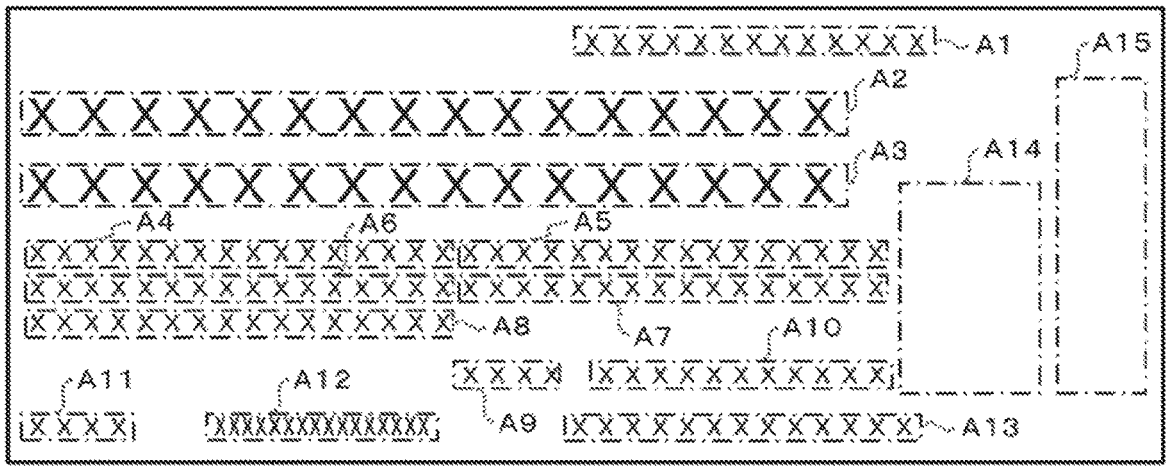
FIG. 2 is a schematic diagram illustrating an example of a form of a coupon which is indicated by form data.
FIG. 3 is a conceptual diagram illustrating an example of a data structure of coupon data.

FIG. 2 is a schematic diagram illustrating an example of a form of the coupon indicated by the form data D1.

In FIG. 2, frames indicated by chain lines indicate areas A1 to A15 where display objects are displayed, and are not actually shown on the coupon. "X" indicates any character. Specifically, each of the areas A1 to A13 is an area in which a character string is displayed as a display object. More specifically, the area A1 is used for displaying a character string indicating an issuance date of the coupon. Each of the areas A2 to A8 is used for displaying a character string indicating any message. The area A9 is used for displaying a character string indicating a title relating to an expiry date. The area A10 is used for displaying a character string indicating an expiry date of the coupon. The area A11 is used for displaying a character string indicating a title relating to a member code. The area A12 is used for displaying a character string indicating a member code. The area A13 is used for displaying a character string indicating a name of the member. The area A14 is used for displaying an image. The area A15 is used for displaying a barcode. The barcode is an example of an optically readable code symbol. In the area A15, another type of code symbol such as a two-dimensional code may be displayed in place of the barcode.

A plurality of form data respectively indicating different forms may be stored in the auxiliary storage device 13. The different forms indicated by the plurality of form data may be any forms, and are determined by, for example, a designer of the POS terminal 10, a manager belonging to a provider who provides the electronic receipt service, a person in charge who uses the POS terminal 10, or the like. When there is a plurality of form data as described above, a pattern number which is a form code for identifying each of them is determined and can be recognized. However, in the present embodiment, only the form shown in FIG. 2 is used.

FIG. 3 is a conceptual diagram illustrating an example of a data structure of the coupon data D2.

The coupon data D2 is associated with one type of coupon. When plural kinds of coupons can be issued, a plurality of coupon data D2 is stored in the auxiliary storage device 13. One coupon data D2 includes fields F1 to F15.

In the field F1, a predetermined coupon code is set for identifying the associated coupon. In the field F2, a code for identifying a pattern of the barcode displayed in the area A15 is set. In the fields F3 to F9, character strings that are displayed in the areas A2 to A8 and indicate contents of messages are set. In the field F10, a character string that is displayed in the area A9 and indicates the title relating to the expiry date is set. In the field F11, a character string which is displayed in the area A10 and indicates the expiry date of the coupon is set. In the field F12, a character string that is displayed in the area A11 and indicates the title relating to the member code is set. In the field F13, a file name of the image displayed in the area A14 is set. In the field F14, a pattern number for identifying the form to be applied to the associated coupon is set. In the field F15, data indicating a condition for issuing the associated coupon is set.

The data set in each of the fields F1 to F15 is determined by a person in charge of the retail store where the POS terminal 10 is installed, and is written by the processor 11 according to an instruction from the person in charge.

When a plurality of form data D1 is stored in the auxiliary storage device 13, which one of the plurality of forms is applied to each of the plurality of coupons is determined in advance. In this case, by setting a predetermined pattern number capable of identifying each of the plurality of forms in the field F14, the form applied to each coupon data D2 can be managed.

A part of the storage area of the auxiliary storage device 23 is used as a member database DB1, a receipt database DB2 and a form database DB3. The member database DB1 stores various kinds of information for managing a user who is a member utilizing the electronic receipt service. For example, the member database DB1 stores member data such as a name and an address of the user in association with a member code for identifying each user. The receipt database DB2 stores various kinds of information to be provided to the user by the electronic receipt service. The receipt database DB2 stores receipt data and coupon data transmitted from the POS terminal 10. The form database DB3 stores form data indicating a form substantially the same as that indicated by the form data D1. If the form data indicating a form different from that indicated by the form data D1 is stored in the auxiliary storage device 13 of any POS terminal 10 included in the electronic receipt system 100, the form database DB3 stores form data indicating a form substantially the same as that indicated by the above-described form data. In this case, each form data is identifiable by the same pattern number as that used for identifying the corresponding form in the POS terminal 10.

Next, an operation of the electronic receipt system 100 configured as described above is described. The contents of the information processing described below are merely an example, and various kinds of processing capable of achieving the same result may be appropriately used.

When the POS terminal 10 is in an operation state in which the registration and checkout relating to one transaction are performed, the processor 11 executes the information processing program stored in the main memory 12 or the auxiliary storage device 13 to execute the information processing described below.

Figure 4:
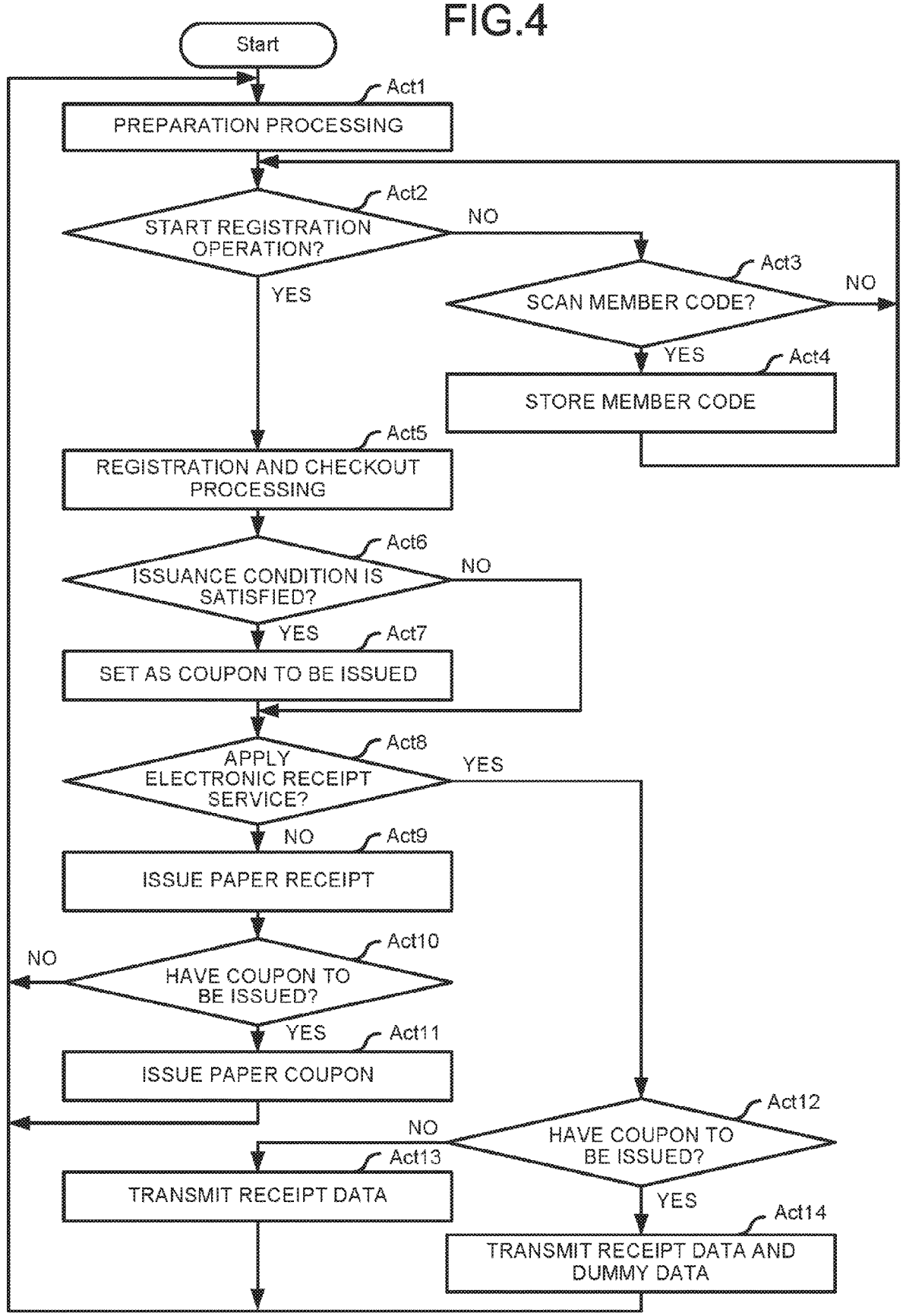
FIG. 4 is a flowchart depicting information processing executed by a processor of the POS terminal in FIG. 1.

FIG. 4 is a flowchart depicting information processing executed by the processor 11.

In Act 1, the processor 11 performs preparation processing such as initializing or deleting data temporarily used in information processing relating to one transaction such as a commodity list.

In Act 2, the processor 11 determines whether or not a registration operation is started. The registration operation is performed by an operator to register a commodity as a transaction object. Then, if the registration operation is not started, the processor 11 determines No, and the process proceeds to Act 3.

In Act 3, the processor 11 determines whether or not the member code is scanned. Then, if the member code is not scanned, the processor 11 determines No and the process returns to Act 2.

In this way, the processor 11 stands by until a registration operation is started in Act 2 or the member code is scanned in Act 3.

The operator of the POS terminal 10 uses the reading device 16 to read the barcode indicating the member code before starting the registration operation for a transaction to which the electronic receipt service is to be applied. Then, the reading device 16 scans the barcode and extracts the member code from the barcode. In response to this, the processor 11 determines Yes in Act 3, and the process proceeds to Act 4. The member code is not limited to being acquired by scanning the barcode, and may be acquired by any other method.

In Act 4, the processor 11 stores the member code scanned by the reading device 16 in the main memory 12 or the auxiliary storage device 13. After this, the processor 11 returns to the standby state in Act 2 and Act 3. If the member code is scanned again, and the process proceeds again to Act 4 accordingly, the processor 11 overwrites the member code already stored in the main memory 12 or the auxiliary storage device 13 with a newly scanned member code.

If the registration is started, the operator performs a registration operation on the commodity which is the transaction object. The registration operation is performed, for example, by executing an operation for using the reading device 16 to read the barcode attached to the commodity, or executing a predetermined operation for designating the commodity with the input device 15.

If the registration operation as described above is performed in the standby state in Act 2 and Act 3, the processor 11 determines Yes in Act 2 and the process proceeds to Act 5.

In Act 5, the processor 11 performs registration processing and checkout processing. Specifically, the processor 11 determines a commodity code specified based on the information acquired by the reading device 16, or a commodity code specified based on the operation on the input device 15 as a commodity code for identifying the commodity which is the transaction object. Then, the processor 11 updates the information in a commodity list area set in the main memory 12 or the auxiliary storage device 13 in order to add the commodity identified by the commodity code to the commodity list. The above is the registration processing.

If all the commodities, which are the transaction objects, are registered and an operation to instruct execution of the checkout processing is performed with the input device 15, the processor 11 calculates a settlement amount to be settled for the purchase of all the registered commodities. Then, the processor 11 performs settlement using a settlement method designated by the operator among a plurality of settlement methods to settle the calculated settlement amount. As a settlement method, various settlement methods using cash, a credit card, a debit card, a prepaid card, electronic money, points, a cash voucher or the like may be appropriately used. The checkout processing is processing for calculating and settling the settlement amount.

The processor 11 may also store the member code in the same way as in Act 4 when the member code is scanned when the registration processing and the checkout processing are performed.

In Act 6, the processor 11 determines whether or not the condition for issuing the coupon is satisfied for the transaction to be processed. Specifically, the processor 11 determines whether or not an applicable condition indicated by the data set in the field F15 in the coupon data D2 is satisfied for the transaction being processed. For example, when the data set in the field F15 indicates an applicable condition such as "the commodity whose commodity code is ooo is contained as the transaction object", the processor 11 determines whether or not the commodity whose commodity code is ooo is contained in the commodity list. If a plurality of coupon data D2 is stored in the auxiliary storage device 13, the processor 11 performs the above determination on each of the plurality of coupon data D2. If at least one applicable condition is satisfied, the processor 11 determines Yes, and the process proceeds to in Act 7.

In Act 7, the processor 11 sets a coupon associated with the coupon data D2 whose applicable condition is satisfied as a coupon to be issued. For example, the processor 11 finds out the coupon data D2 in which data indicating the satisfied applicable condition is set in the field F15. Then, the processor 11 stores the coupon code set in the field F1 of the coupon data in the main memory 12 or the auxiliary storage device 13 as a code for identifying the coupon to be issued. The process then proceeds to Act 8. If none of the applicable conditions is satisfied, the processor 11 determines No in Act 6, and the process passes Act 7 and proceeds to Act 8.

In Act 8, the processor 11 determines whether or not the electronic receipt service is to be applied. For example, when the member code is not stored in Act 4 and no member code is stored in the main memory 12 or the auxiliary storage device 13, the processor 11 determines that the electronic receipt service is not applied. In this case, the processor 11 determines No in Act 8, and the process proceeds to Act 9.

In Act 9, the processor 11 issues a paper receipt. Specifically, the processor 11 generates a receipt image containing a character string or the like indicating the content of the transaction based on the commodity list and the result of the settlement processing. For example, a store code, a date and time, a register number, a code of a store clerk, a name of the store clerk, a user code, a commodity code, a commodity name, a unit price, a subtotal amount, a tax amount, a total amount, a deposit amount, a change amount, transaction quantity and a receipt number are contained in the receipt image as appropriate. Then, the processor 11 transmits the receipt image to the printer 17 to perform printing on the receipt paper.

In Act 10, the processor 11 determines whether or not there is a coupon to be issued. Then, if the coupon code stored in Act 7 is stored in the main memory 12 or the auxiliary storage device 13, the processor 11 determines Yes, and the process proceeds to Act 11.

In Act 11, the processor 11 issues a paper coupon. Specifically, an image buffer having a size corresponding to the form data D1 is formed in the main memory 12. The processor 11 copies or decompresses the character strings set in the fields F3 to F12 in the coupon data D2 in which the coupon code of the coupon to be issued is set in the field F1 on the image buffer to display the character strings in the associated areas A2 to A11. The processor 11 acquires the image file specified by the image file name set in the field F13 of the above-described coupon data D2, and copies or decompresses it on the image buffer to display the image indicated by the image file in the area A14. The processor 11 generates a barcode corresponding to the code set in the field F2 of the above-described coupon data D2, and copies or decompresses the barcode on the image buffer to display the barcode in the area A15. In addition, the processor 11 also copies or decompresses character strings indicating the current date, the member code and the name of the member on the image buffers to display them in the areas A1, A12 and A13, respectively. The processor 11 reads out the member code stored in Act 4 as the member code. The processor 11 acquires the name of the member identified by the member code stored in Act 4 as the name of the member from the electronic receipt server 20. Then, the processor 11 transmits the coupon image formed in the image buffer to the printer 17 in this manner, and prints it on the receipt paper. When there is a plurality of coupons to be issued, the processor 11 sequentially performs the above-described processing on each of the coupon data associated with the plurality of coupons, and sequentially issues the paper coupons.

As described above, if the issuance condition is satisfied, the processor 11 determines to issue a coupon as an example of a promotion receipt for individual promotion. Thus, the processor 11 executes the information processing program to execute the information processing, and in this way, the computer having the processor 11 as the central portion functions as a first determination module. If it is determined that the coupon is to be issued and it is determined that the electronic receipt service is not applied, the processor 11 functions as a control module for controlling the printer 17 to print a paper coupon as the example of the promotion receipt.

Figure 5:
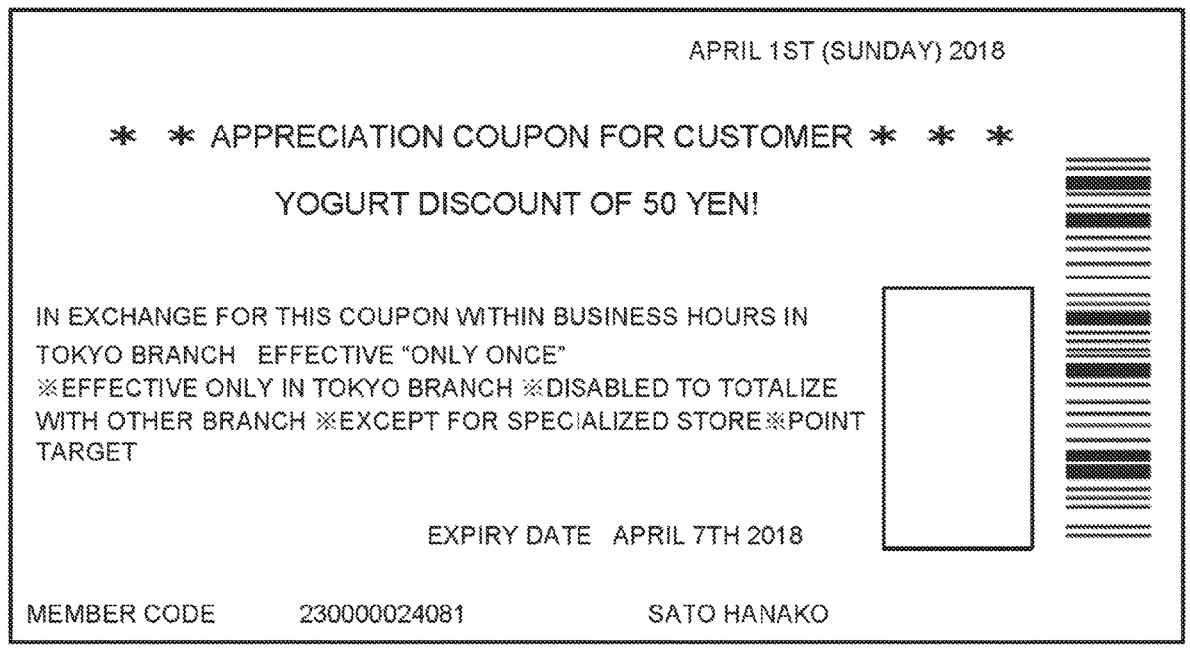
FIG. 5 is a schematic diagram illustrating an example of a paper coupon.

FIG. 5 is a schematic diagram illustrating an example of the paper coupon.

In FIG. 5, however, only an outline of the image displayed in the area A14 is shown, and contents of the image are omitted.

After that, the processor 11 again executes the processing in Act 1, and then returns to the standby state in Act 2 and Act 3. In other words, the processor 11 prepares for processing relating to the next transaction. If the processing in Act 7 is passed, and no coupon code is stored in the main memory 12 or the auxiliary storage device 13, the processor 11 determines No in Act 10, and the process passes Act 11 and returns to Act 1. In this case, the processor 11 issues only the paper receipt, and does not issue the paper coupon.

For example, when the member code stored in Act 4 is stored in the main memory 12 or the auxiliary storage device 13, the processor 11 determines to apply the electronic receipt service. In this case, the processor 11 determines Yes in Act 8 and the process proceeds to Act 12. Thus, the processor 11 executes the information processing program to execute the information processing, and in this way, the computer having the processor 11 as the central portion functions as a second determination module that determines to apply the electronic receipt service.

In Act 12, the processor 11 determines whether or not there is a coupon to be issued. Then, the processor 11 determines that the electronic receipt service is not applied, for example, when the member code is not stored in the Act 4 and no member code is stored in the main memory 12 or the auxiliary storage device 13. Then, the processor 11 determines No in this case and the process proceeds to Act 13.

In Act 13, the processor 11 transmits the receipt data relating to the current transaction to the electronic receipt server 20. Specifically, the processor 11 generates the receipt data by arranging data such as character strings to be shown on the paper receipt in a predetermined format, as in the case of issuing the paper receipt. All of the data to be shown in the receipt image may be included in the receipt data or a part of the data to be shown in the receipt image may not be included in the receipt data. Other data different from the data to be shown the receipt image may be included in the receipt data. The member code is included in the receipt data. In the present embodiment, the receipt data is data in a text format. Then, the processor 11 transmits the receipt data to the electronic receipt server 20 from the communication interface 18 via the communication network 40.

After that, the processor 11 again executes the processing in Act 1, and then returns to the standby state in Act 2 and Act 3. In other words, the processor 11 prepares for processing relating to the next transaction.

On the other hand, if the coupon code stored in Act 7 is stored in the main memory 12 or the auxiliary storage device 13, the processor 11 determines Yes in Act 12 and the process proceeds to Act 14.

In Act 14, the processor 11 transmits the above-described receipt data and dummy data to the electronic receipt server 20. Specifically, the processor 11 generates receipt data in the same manner as in Act 13. The processor 11 generates dummy data by arranging the data which is the display object to be shown on the paper coupon issued in Act 11 in the same format as the receipt data. In other words, the dummy data is in the text format and has the same structure as that of the receipt data, but unlike the receipt data, the dummy data includes the display object to be shown on the coupon. In other words, the dummy data is an example of promotion receipt data including the display object to be shown on the coupon as an example of a promotion receipt and a member code as an example of a user code.

Data other than the display object to be shown on the paper coupon may be included in the dummy data. Any data may be included as the data, and is determined in advance, for example, by a person who decides specifications of the electronic receipt service. Such data may include date and time, a register number, an operator code, a name of the operator, a receipt number, a store number, and the like. The date and time indicates a timing at which the transaction relating to issuance of the coupon is performed. The register number is a predetermined number for identifying the POS terminal 10 which performs the registration processing and the checkout processing on the above-described transaction. The operator code and the name of the operator are a code and a name for identifying the operator who operates the above-described POS terminal 10. The receipt number is determined to be capable of identifying each of the paper receipt and the electronic receipt issued at the retail store where the transaction is made. The store number is a predetermined number capable of identifying each of a plurality of retail stores.

Then, the processor 11 transmits the receipt data and the dummy data to the electronic receipt server 20 from the communication interface 18 via the communication network 40. Thus, the processor 11 executes the information processing program to execute the information processing, and in this way, the computer having the processor 11 as the central portion functions as a first output module. Specifically, the processor 11 functions to output the dummy data as the promotion receipt data to the electronic receipt server 20 having a function of a promotion receipt server.

After that, the processor 11 again executes the processing in Act 1, and then returns to the standby state in Act 2 and Act 3. In other words, the processor 11 prepares for processing relating to the next transaction.

FIG. 6 is a conceptual diagram illustrating an example of the dummy data corresponding to the paper coupon shown in FIG. 5.

In FIG. 6, "230000024081" shown in a line next to "SRID" is the member ID. In the dummy data, by appending an identifier "*H" to the end of the member ID, it is possible to specify that the data is the dummy data.

In the dummy data, a character string enclosed in parentheses such as "coupon code" is a tag, which indicates the content indicated by the data shown in the next line. Specifically, the dummy data shown in FIG. 6 relates to a coupon whose coupon code is "000001".

When the receipt data or the receipt data and the dummy data are transmitted to the electronic receipt server 20 via the communication network 40, the communication interface 24 receives the receipt data or the receipt data and the dummy data. In this case, the communication interface 24 notifies the processor 21 that the data is received.

The processor 21 receiving this notification updates the receipt database DB2 to include the received receipt data in the receipt database DB2. If the dummy data is received, the processor 21 updates the receipt database DB2 to include the dummy data in association with the receipt data in the receipt database DB2.

When the member wants to confirm the receipt managed by the electronic receipt server 20, the member starts an application program to use the electronic receipt service in the information terminal 30 that he/she possesses. Then, the member performs a predetermined operation for displaying the receipt. Then, the information terminal 30 transmits a command requesting display of the receipt to the electronic receipt server 20 via the communication network 40.

When the command is transmitted to the electronic receipt server 20 via the communication network 40, the communication interface 24 receives the command and notifies the processor 21 about the reception of the command. The processor 21 receiving the notification executes the information processing program stored in the main memory 22 or the auxiliary storage device 23 to execute the information processing as described below.

Figure 7:
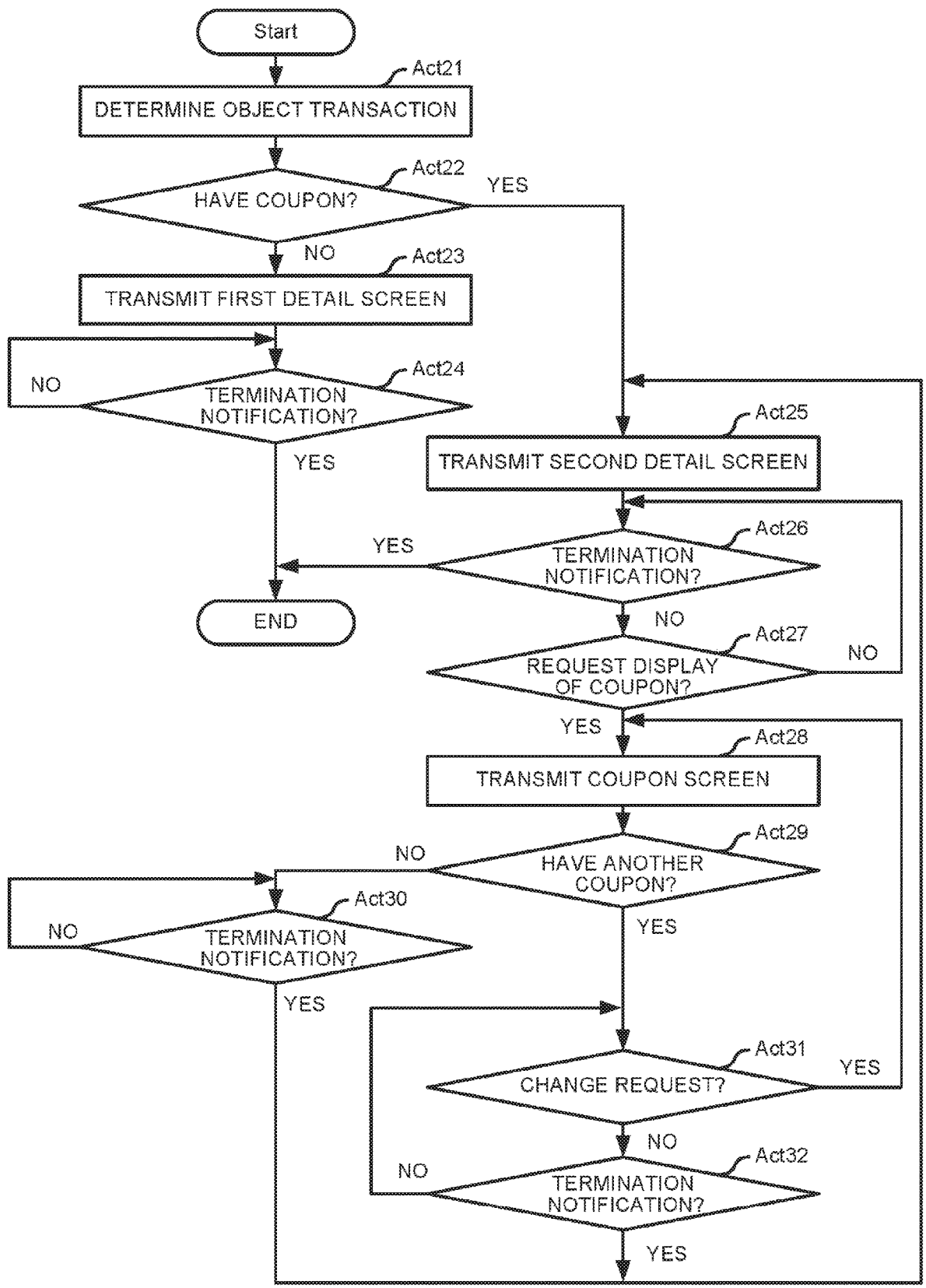
FIG. 7 is a flowchart depicting information processing executed by a processor of the electronic receipt server in FIG. 1.

FIG. 7 is a flowchart depicting information processing executed by the processor 21.

In Act 21, the processor 21 determines a transaction as an object of a receipt display operation. For example, the processor 21 generates data of a list screen showing a list of receipt data associated with the member who requests display of the receipt among the receipt data managed in the receipt database DB2, and transmits the data of the list screen to the information terminal 30. Then, if one of the transactions shown on the list screen is designated by the member and the designation of the transaction is notified from the information terminal 30, the processor 21 sets the designated transaction as the transaction to be subjected to the receipt display operation.

In Act 22, the processor 21 determines whether or not there is a coupon (hereinafter, referred to as an associated coupon) issued for a transaction to be subjected to the receipt display operation. Specifically, if the coupon data associated with the receipt data relating to the transaction to be subjected to the receipt display operation is not included in the receipt database DB2, the processor 21 determines No and the process proceeds to Act 23.

In Act 23, the processor 21 generates a first detail screen and transmits it to the information terminal 30 requesting the display of the receipt via the communication network 40. The first detail screen shows the contents of the designated transaction and does not include buttons or the like for instructing to display the associated coupon. The processor 21 actually generates screen data for displaying the first detail screen on the information terminal 30 and transmits it to the information terminal 30.

The information terminal 30 displays a first detail screen with a function performed by executing the above-described application program. By doing this, the member can confirm the details relating to the past transaction. If the member already confirms the details relating to the transaction, the member performs a predetermined operation for instructing to terminate the display. If the above operation is performed, the information terminal 30 terminates the display of the first detail screen. The information terminal 30 notifies the electronic receipt server 20 that the display of the first detail screen is terminated.

In Act 24, the processor 21 stands by until the termination of display of the first detail screen is notified. If the processor 21 is notified that the display of the first detail screen is terminated as described above, the processor 21 determines Yes, and terminates the information processing shown in FIG. 7.

On the other hand, if the receipt database DB2 includes the dummy data associated with the receipt data relating to the transaction to be subjected to the receipt display operation, the processor 21 determines Yes in Act 22 and the process proceeds to Act 25.

In Act 25, the processor 21 generates a second detail screen and transmits data of the second detail screen to the information terminal 30 requesting the receipt display via the communication network 40. The second detail screen shows contents of the designated transaction, and also includes a button or the like for instructing display of the associated coupon. The processor 21 actually generates screen data for displaying the second detail screen on the information terminal 30 and transmits it to the information terminal 30.

The information terminal 30 displays the second detail screen. By doing this, the member can confirm the details of the past transaction. If the member already confirms the details of the transaction, the member performs a predetermined operation for instructing to terminate the display. If the above operation is performed, the information terminal 30 terminates the display of the second detail screen. The information terminal 30 notifies the electronic receipt server 20 that the display of the second detail screen is terminated.

In Act 26, the processor 21 determines whether or not the termination of the display of the second detail screen is notified. If the termination of the display of the second detail screen is notified as described above, the processor 21 determines Yes, and terminates the information processing shown in FIG. 7.

However, if the termination of the display of the second detailed screen is not notified, the processor 21 determines No and the process proceeds to Act 27.

In Act 27, the processor 21 determines whether or not the display of the associated coupon is requested. Then, if the request is not made, the processor 21 determines No, and the process returns to Act 26.

Thus, the processor 21 stands by until the termination of the display of the second detail screen is notified in Act 26 or the display of the associated coupon is requested in Act 27.

If the member wants to confirm the coupon issued at the time of the transaction confirmed with the second detail screen, the member instructs display of a coupon screen, for example, by operating a button included in the second detail screen. If the instruction is received, the information terminal 30 transmits a command requesting display of the coupon to the electronic receipt server 20 via the communication network 40.

If the command is received by the communication interface 24, the processor 21 determines Yes in Act 27, and the process proceeds to Act 28.

In Act 28, the processor 21 generates data of a coupon screen and transmits the data of the coupon screen to the information terminal 30 requesting the display of the coupon via the communication network 40. The coupon screen is used to show an outer appearance of the paper coupon issued by the POS terminal 10 when the electronic receipt service is not used substantially without any change. Specifically, the processor 21 extracts the dummy data relating to the associated coupon from the receipt database DB2. The processor 21 then generates data of a coupon screen by arranging display objects included in the dummy data in a form indicated by the form data included in the form database DB3. The processor 21 actually generates screen data for displaying the coupon screen on the information terminal 30 and transmits it to the information terminal 30. The processor 21 refers to the pattern number included in the dummy data when a plurality of form data is included in the form database DB3 and these forms are permitted to be used. Then, the processor 21 generates data of a coupon screen by applying the form indicated by the form data identified by the pattern number.

The information terminal 30 receiving the data of the coupon screen displays the coupon screen.

Figure 8:
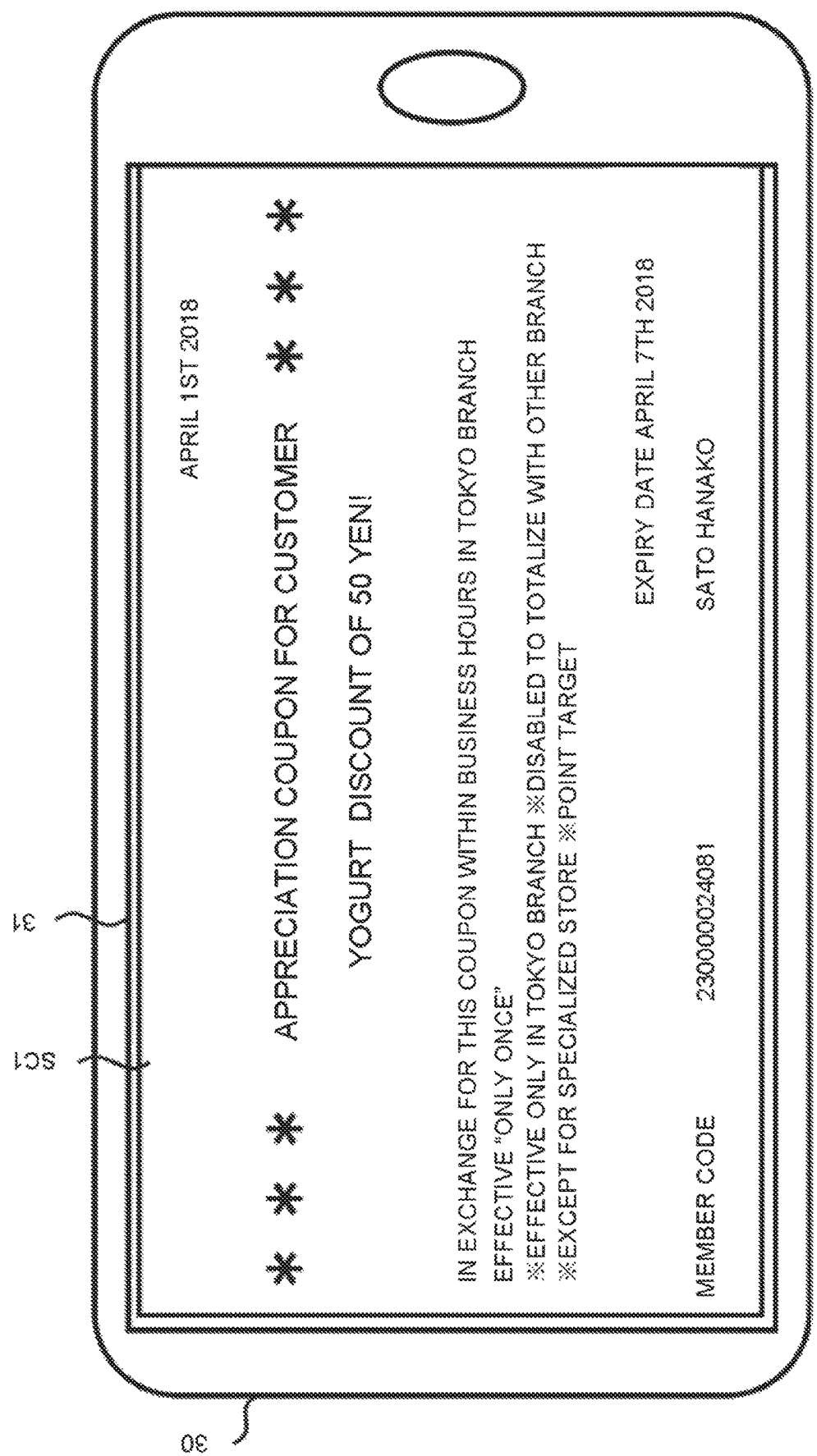
FIG. 8 is a schematic diagram illustrating an appearance of the information terminal in FIG. 1 in a state of displaying a coupon screen.

FIG. 8 shows an appearance of the information terminal 30 displaying a coupon screen SC1.

The coupon screen SC1 shown in FIG. 8 corresponds to the paper coupon shown in FIG. 5. The coupon screen SC1 shows all of the display objects shown in the paper coupon shown in FIG. 5; however, due to a display size of a display device 31 of the information terminal 30, a part of the coupon screen SC1 is not displayed on the display device 31 and is not illustrated here. The information terminal 30 scrolls the coupon screen SC1 in response to a scrolling operation to display the part that is not illustrated in FIG. 8. Then, the member can use the coupon by presenting the information terminal 30 in a state in which the coupon screen SC1 is displayed to the store clerk.

In this manner, an operation of displaying the coupon screen on the information terminal 30 is equivalent to issuance of the coupon. Then, such a coupon screen is displayed when the processor 11 determines that the issuance condition is satisfied in Act 6 in FIG. 4. Thus, the processor 11 executes the information processing program to execute the information processing, and in this way, the computer having the processor 11 as the central portion functions as a first determination module. The computer having the processor 11 as the central portion functions as a generation module that generates the screen data for displaying the coupon screen on the information terminal 30 as data indicating a promotion receipt image. The computer having the processor 11 as the central portion functions as a second output module that outputs the coupon screen as an example of the promotion receipt screen to the information terminal 30 used by the user identified by the member code output from the POS terminal 10.

The coupon screen SC1 includes a barcode as shown in FIG. 5, and when the coupon is used, the barcode is scanned by the POS terminal 10 or the like. For this reason, the member or the store clerk scrolls the coupon screen SC1 to display the barcode and then enables the barcode to be scanned.

In the electronic receipt server 20, the processor 21 may generate the coupon screen as the following screen.

Figure 9:
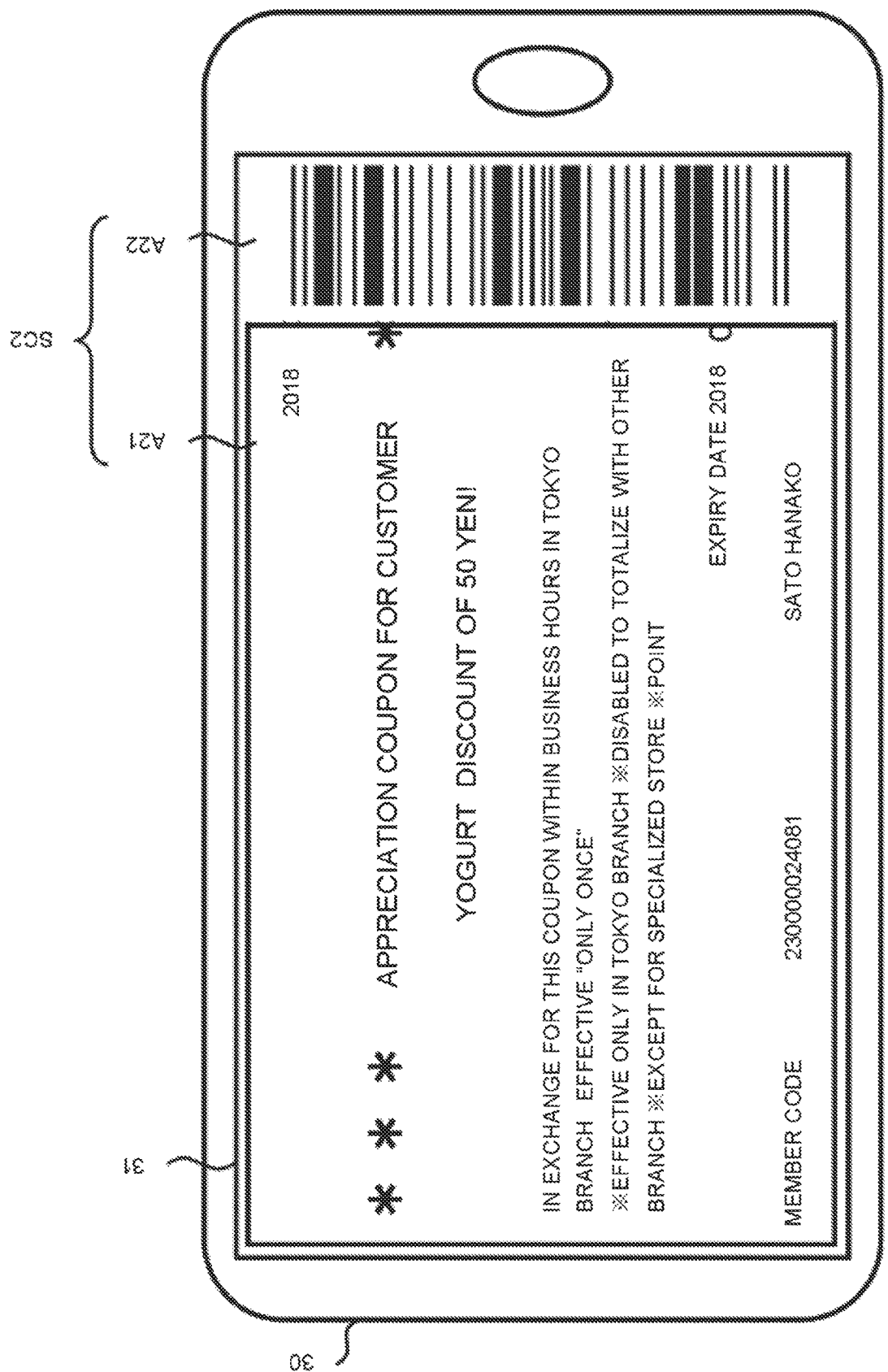
FIG. 9 is a schematic diagram illustrating another appearance of the information terminal in FIG. 1 in a state of displaying a coupon screen.

FIG. 9 is a schematic diagram illustrating another appearance of the information terminal 30 displaying the coupon screen SC2.

The coupon screen SC2 includes an area A21 and an area A22. An image differing from the coupon screen SC1 only in that it does not contain the barcode is shown in the area A21. The area A21 is scrollable like the coupon screen SC1. The above-described barcode is shown in the area A22 in an enlarged and fixed manner.

According to the coupon screen SC2, the time and labor taken in scanning the barcode is reduced.

If the member has already confirmed the coupon or the coupon has already been used, the member performs a predetermined operation for instructing to terminate the display. The information terminal 30 terminates the display of the coupon screen if the corresponding operation is performed. The information terminal 30 notifies the electronic receipt server 20 that the display of the coupon screen is terminated.

In Act 29, the processor 21 determines whether or not there is an associated coupon in addition to the associated coupon associated with the coupon screen as described above. Then, if the number of the associated coupons is only one, the processor 21 determines No and the process proceeds to Act 30.

In Act 30, the processor 21 stands by until the termination of the display of the coupon screen is notified. If the termination of the display of the coupon screen is notified as described above, the processor 21 determines Yes, and repeats the processing subsequent to Act 25 in the same manner as described above. In other words, the processor 21 enables the information terminal 30 to again display the second detail screen in Act 25, and then returns to the standby state in Act 26 and Act 27.

If there is an associated coupon in addition to the associated coupon associated with the coupon screen already transmitted in Act 28, the processor 21 determines Yes in Act 29, and the process proceeds to Act 31.

In Act 31, the processor 21 determines whether or not a change of the associated coupon to be displayed is requested. Then, if the change is not request, the processor 21 determines No, and the process proceeds to Act 32.

In Act 32, the processor 21 stands by until the termination of the display of the coupon screen is notified. Then, if the termination is notified, the processor 21 determines No, and the process returns to Act 31.

Thus, the processor 21 stands by until the change is requested in Act 31 or the termination is notified in Act 32.

If the member wants to confirm another coupon, the member performs a predetermined operation for instructing the change. Then, the information terminal 30 transmits a command requesting the change to the electronic receipt server 20 via the communication network 40.

If the command is received by the communication interface 24 and the reception of the command is notified to the processor 21, the processor 21 determines Yes in Act 31, and repeats the processing subsequent to Act 28 in the same manner as described above. However, at this time, the processor 21 extracts the dummy data relating to another associated coupon from the receipt database DB2, and generates data of the coupon screen in the same manner as described above by using the dummy data.

Then, in the standby state in Act 31 and Act 32, if the termination is notified as described above, the processor 21 determines Yes in Act 32, and repeats the processing subsequent to Act 25 in the same manner as described above. In other words, the processor 21 enables the information terminal 30 to again display the second detail screen in Act 25, and then returns to the standby state in Act 26 and Act 27.

As described above, according to the electronic receipt system 100, the POS terminal does not issue the paper coupon to the member who wants to apply the electronic receipt service. The electronic receipt server 20 displays a coupon screen showing the outer appearance of the paper coupon substantially without any change on the information terminal 30 for the transaction for which the issuance condition for the coupon is satisfied. Therefore, it is possible to reduce the burden on a receiving party in terms of storage of the coupon.

In the electronic receipt system 100, the dummy data including the display object to be shown on the coupon in the text format is transmitted from the POS terminal 10 to the electronic receipt server 20. For this reason, the amount of data required to be transmitted and stored can be reduced when compared with a case in which the image data of the coupon screen is transmitted without any change, and the burden on the resource for transmission and storage can be reduced.

The electronic receipt server 20 stores the form data indicating each of a plurality of forms, and can generate data of the coupon screen by applying a form indicated by the form data that is identified by the pattern number included in the dummy data. It is possible to deal with the case of issuing coupons in a plurality of forms.

The present embodiment can be modified as follows.

When the promotion receipt for individual promotion other than the coupon is issued, the same is applicable as in the above embodiment.

The display of the coupon screen may be performed irrespective of the display of the receipt screen. In this case, the dummy data does not need to include data for identifying individual transactions. In other words, for example, the electronic receipt server 20 manages the dummy data in association with the member code, and enables the information terminal 30 to display a list screen of coupons in response to access from the information terminal 30. Then, the electronic receipt server 20 enables the information terminal 30 to display the coupon screen of the coupon designated by the member from the list screen.

The dummy data may be generated by sales processing apparatus such as a cash register that has a registration function and a settlement function regardless of the POS, a checkout apparatus that does not have the registration function or a settlement apparatus that does not have the registration function and a function of calculating a settlement amount.

The data of the coupon screen may be generated by a server that does not have a receipt data management function.

All or a part of functions performed by the processor 11 or the processor 21 by executing the information processing may be performed by hardware such as a logic circuit or the like which executes the information processing not based on the program. Each of the above-described functions may also be performed by a combination of software control with the hardware such as the above-described logic circuit.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A system comprising:
a point-of-sale (POS) terminal including:
  a printer;
  a first communication interface;
  a first storage device in which first form data specifying a first image layout of image elements on a paper slip to be printed by the printer is stored; and
  a first processor configured to:
    determine whether or not a promotion is offered with respect to a transaction;
    determine whether or not an electronic receipt is issued with respect to the transaction;
    control the printer to print an image indicating the promotion on a paper slip with the first image layout specified by the first form data, when it is determined that the promotion is offered and the electronic receipt is not issued with respect to the transaction; and
    control the first communication interface to transmit promotion data of the promotion in a text format, the promotion data including a form identifier of the first image layout in the text format and not including the first form data, when it is determined that the promotion is offered and the electronic receipt is issued with respect to the transaction; and
an electronic receipt server including:
  a second communication interface configured to communicate with the first communication interface;
  a second storage device in which second form data specifying a second image layout corresponding to the first image layout is stored; and
  a second processor configured to:
    generate promotion screen data for displaying the promotion with the second image layout specified by the second form data, based on the form identifier included in the promotion data, when the second communication interface receives the promotion data; and
    control the second communication interface to transmit the promotion screen data to a customer terminal.

2. The system according to claim 1, wherein the promotion data includes no form data specifying any image layout of image elements on a paper slip.

3. The system according to claim 1, wherein the first processor is further configured to:
generate electronic receipt data in a same text format as the text format of the promotion data, when it is determined that the electronic receipt is issued with respect to the transaction, and
control the first communication interface to transmit the electronic receipt data in the text format together with the promotion data in the text format, when it is determined that the promotion is offered and the electronic receipt is issued with respect to the transaction.

4. The system according to claim 3, wherein the electronic receipt data includes no form data specifying any image layout of image elements on a paper slip.

5. The system according to claim 4, wherein the second processor is further configured to:

generate electronic receipt screen data for displaying the electronic receipt, when the second communication interface receives the electronic receipt screen data, and control the second communication interface to transmit the electronic receipt screen data.

6. The system according to claim 3, wherein the second processor is further configured to control the second communication interface to transmit the promotion screen data to the customer terminal together with the electronic receipt data, in response to a request for the electronic receipt data.

7. The system according to claim 1, wherein
the promotion data includes a customer identifier, and
the second processor is configured to control the second communication interface to transmit the promotion screen data to a customer terminal associated with the customer identifier.

8. The system according to claim 1, wherein promotion screen data includes first screen data for displaying an image of the promotion with the second image layout and an image of an optically-readable code indicative of an identifier of the promotion, such that the image of the promotion and the image of the optically-readable code are scrollable altogether.

9. The system according to claim 1, wherein promotion screen data includes first screen data for displaying an image of the promotion with the second image layout in a scrollable manner and second screen data for displaying an image of an optically-readable code indicative of an identifier of the promotion, such that the optically-readable code is not scrolled by scrolling of a displayed image of the promotion.

10. The system according to claim 1, wherein the second image layout is different from the first image layout.

11. A point-of-sale (POS) terminal comprising:
a printer;
a communication interface;
a storage device in which first form data specifying a first image layout of image elements on a paper slip to be printed by the printer is stored; and
a processor configured to:
determine whether or not a promotion is offered with respect to a transaction;
determine whether or not an electronic receipt is issued with respect to the transaction;
control the printer to print an image indicating the promotion on a paper slip with the first image layout specified by the first form data, when it is determined that the promotion is offered and the electronic receipt is not issued with respect to the transaction; and
control the communication interface to transmit promotion data of the promotion in a text format, the promotion data including a form identifier of the first image layout in the text format and not including the first form data, when it is determined that the promotion is offered and the electronic receipt is issued with respect to the transaction.

12. The POS terminal according to claim 11, wherein promotion data includes no form data specifying any image layout of image elements on a paper slip.

13. The POS terminal according to claim 11, wherein the processor is further configured to:
generate electronic receipt data in a same text format as the text format of the promotion data, when it is determined that the electronic receipt is issued with respect to the transaction; and
control the communication interface to transmit the electronic receipt data in the text format together with the promotion data in the text format, when it is determined that the promotion is offered and the electronic receipt is issued with respect to the transaction.

14. The POS terminal according to claim 13, wherein the electronic receipt data includes no form data specifying any image layout of image elements on a paper slip.

15. The POS terminal according to claim 11, wherein the second image layout is different from the first image layout.

16. A method comprising:
at a point-of-sale (POS) terminal:
determining whether or not a promotion is offered with respect to a transaction;
determining whether or not an electronic receipt is issued with respect to the transaction;
printing an image indicating the promotion on a paper slip with a first image layout specified by first form data stored at the POS terminal, when it is determined that the promotion is offered and the electronic receipt is not issued with respect to the transaction; and
transmitting promotion data of the promotion in a text format, the promotion data including a form identifier of the first image layout in the text format and not including the first form data, when it is determined that the promotion is offered and the electronic receipt is issued with respect to the transaction; and
at an electronic receipt server:
generating promotion screen data for displaying the promotion with a second image layout specified by second form data stored at the electronic receipt server, the second image layout corresponding to the first image layout, based on the form identifier included in the promotion data, when the second communication interface receives the promotion data, and
transmitting the promotion screen data to a customer terminal.

17. The method according to claim 16, wherein the promotion data includes no form data specifying any image layout of image elements on a paper slip.

18. The method according to claim 16, further comprising, at the POS terminal:
generating electronic receipt data in a same text format as the text format of the promotion data, when it is determined that the electronic receipt is issued with respect to the transaction, and
transmitting the electronic receipt data in the text format together with the promotion data in the text format, when it is determined that the promotion is offered and the electronic receipt is issued with respect to the transaction.

19. The method according to claim 16, wherein promotion screen data includes first screen data for displaying an image of the promotion with the second image layout and an image of an optically-readable code indicative of an identifier of the promotion, such that the image of the promotion and the image of the optically-readable code are scrollable altogether.

20. The method according to claim 16, wherein promotion screen data includes first screen data for displaying an image of the promotion with the second image layout in a scrollable manner and second screen data for displaying an image of an optically-readable code indicative of an identifier of the promotion, such that the optically-readable code is not scrolled by scrolling of a displayed image of the promotion.

* * * * *